May 31, 1960
H. ARKUS
2,939,128
PLAN POSITION-INDICATOR SYSTEM
Filed Jan. 12, 1955
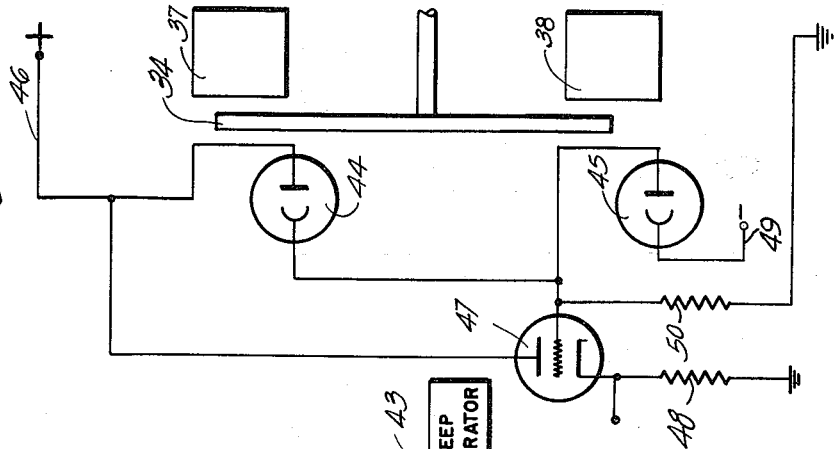
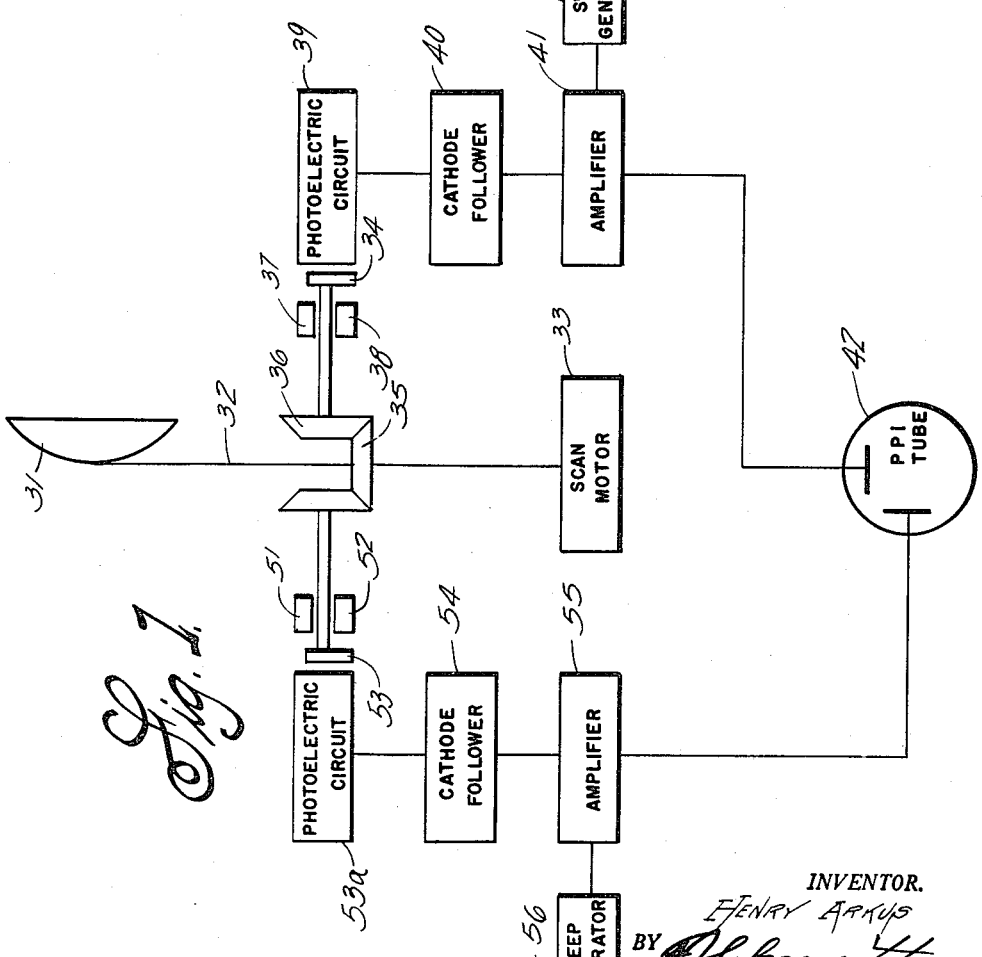
INVENTOR.
HENRY ARKUS
BY
ATTORNEYS

United States Patent Office 2,939,128
Patented May 31, 1960

2,939,128

PLAN POSITION-INDICATOR SYSTEM

Henry Arkus, Brooklyn, N.Y., assignor, by mesne assignments, to the United States of America as represented by the Secretary of the Navy Filed Jan. 12, 1955, Ser. No. 481,501

1 Claim. (Cl. 343—5)

The present invention relates to a novel and improved electron deflection apparatus for the cathode ray display tube of a radar system and more particularly to apparatus for developing a rotary sweep voltage for the deflection plates of a cathode ray display tube wherein the quadrature voltages that ultimately produce the sweep voltage are substantially uniform in amplitude and wherein the sweep voltage is kept in accurate synchronism with rotation of the antenna of the radar system.

In various commercial and military applications of radar, it is often necessary and desirable to accurately determine the azimuth direction of objects about a predetermined point. The Plan Position Indication or PPI system affords perhaps the best known and most practical method of providing information of this type. In accordance with this system, a pair of quadrature sinusoidal voltages are developed as the highly directional antenna of the radar system is rotated at a predetermined constant rate about the 360 degree search sector. These voltages are then used to produce a rotary or circular sweep effect upon the stream of electrons in the display tube. In this system, it is essential, however, that the sweep effect which is developed and which emanates at the center of the face of the tube and successively sweeps outwardly therefrom about its circumference be kept in accurate synchronism with the instantaneous directional position of the antenna at all times. It is also essential that the amplitude of the quadrature voltages that are developed be maintained substantially constant at all times. Although various sweep generating and electron deflection circuits have been devised heretofore for use in a PPI system, considerable difficulty has been experienced in the past in providing suitable apparatus which satisfies these requirements of the system in a practical and effective way.

It is a principal object of the present invention to provide novel and improved electron deflection apparatus for a radar system.

It is a further object of the present invention to provide novel and improved rotary sweep voltage apparatus for the deflection plates of a cathode ray display tube wherein the component quadrature voltages which ultimately produce the sweep are substantially uniform in amplitude.

It is a further object of the present invention to provide novel and improved rotary sweep voltage apparatus for the deflection plates of a cathode ray display tube wherein the sweep is constantly kept in accurate synchronism with rotation of the radar antenna.

Other objects and many of the attendant advantages of this invention will be readily appreciated as the same becomes better understood by reference to the following detailed description when considered in connection with the accompanying drawings wherein:

In the drawing which is illustrative of the invention:

Figure 1 is a diagrammatic view of a preferred embodiment of the invention;

Figure 2 is a circuit diagram of the details of the photocell shown in Figure 1.

One preferred embodiment of the present invention is illustraed in Figure 1 of the drawing. As shown therein, the radar antenna 31 and its associated shaft 32 is preferably driven at a constant predetermined rate by the scan motor or the like 33. The cam element 34 which is driven in synchronism with the antenna 31 in any suitable manner such as by means of the meshed gears 35 and 36 shown in the drawing is positioned between the light sources 37 and 38 and the photoelectrically controlled sweep device 39.

The output circuit of the photoelectric device 39 is coupled to the cathode follower 40, the amplifier 41 and the horizontal deflection plates of the display tube 42 as is shown. As will be more apparent hereinafter, the sweep generator 43 varies the output of the amplifier between zero and a preselected maximum value in the conventional manner to produce the desired rotary sweep effect on the face of the display tube 42.

Referring to Figure 2 of the drawing for a detailed description of the circuits of the photoelectric device 39, the photocells 44 and 45 which are sensitive to the lamp sources 37 and 38 respectively are preferably connected in series between the positive voltage supply line 46 and the negative supply line 49. As will be indicated more fully hereinafter, the light sensitive surfaces of the photocells are periodically partially and substantially entirely shielded from the lamps 37 and 38 as the cam 34 rotates.

The junction of the anode of photocell 45 with the cathode of photocell 44 provides a convenient output for the photocell circuit and is therefore preferably connected as shown to the grid of the cathode follower 47. The plate circuit of the cathode follower extends from the positive voltage supply line 46 through the triode 47 and resistor 48 to ground. The grid of the cathode follower is also preferably coupled to ground through the load resistor 50 as shown in the drawing.

Inasmuch as the lamp sources 51 and 52, the cam 53, the photoelectric circuit 53a, the cathode follower circuit 54, the amplifier 55, the sweep generator 56 for the vertical deflection plates in tube 42 are identical to the corresponding circuits and apparatus for the horizontal deflection plates, a detailed description of the same is omitted here for the sake of simplicity. It need only be understood for a full understanding of the present invention that rotation of the cam 53 is 90 degrees out of phase with rotation of cam 34.

In operation as the radar antenna 31 and its shaft 32 rotate, elements 34 and 53 also rotate and produce in the photocells 44 and 45 quadrature sinusoidal electrical impulses. These impulses are then used to drive the cathode followers 40 and 54 and the amplifiers 41 and 55 which are controlled by the sweep apparatus 43 and 56 to produce the desired circular or rotating sweep for the cathode ray display tube 42.

Although not essential to the basic operation of the present invention, the series connection of two photocells as shown for each sweep generator is preferred in order to compensate for and effectively neutralize the usual non linear characteristic of the individual photocell. More specifically, light from one lamp source increases as light from the other decreases to produce some cancellation of the errors in the photocells.

For optimum results the various lamp sources described above are preferably regulated to emit a substantially constant predetermined intensity. This may be done in any suitable conventional manner such as by means of a voltage, current or phototube regulator.

Although the cathode follower stage between the photocell circuit and its associated sweep generator is preferred, it is to be understood that it could be eliminated such that the output of the photocell circuit is directly connected with and drives its respective sweep generator without departing from the spirit or scope of the present invention.

As an alternative construction, the cam elements 34 and 53 could be mounted directly on the antenna shaft to eliminate the intermediate connective gear mechanisms disclosed heretofore. In such a construction as in the above disclosed embodiments of the invention, interaction of the light source systems for the horizontal and vertical sweep generators can if necessary be reduced and/or eliminated by the use of differently polarized light sources or different colored light with appropriately polarized or filtered photocell pickup devices.

Obviously many modifications and variations of the present invention are possible in the light of the above teachings. It is therefore to be understood that within the scope of the appended claim the invention may be practiced otherwise than as specifically described.

What is claimed is:

In electron deflection apparatus for a radar system having a rotating antenna a sine wave generator which is synchronized with rotary movement of the antenna comprising an opaque cam coupled to the antenna for rotation therewith, said cam being contoured so as to generate a sine function; a pair of light sources positioned on one side of the cam adjacent diametrically disposed points on the circumferential path of the cam; a pair of photocells positioned on the opposite side of the cam adjacent the said diametrically disposed points; a source of electrical energy; an electrical circuit connecting the said photocells in series with the source; a cathode follower having a plate; a control grid, and a cathode circuit; means coupling the grid circuit of the cathode follower to the junction of the series connected photocells; and an output circuit coupled to the cathode circuit of the cathode follower.

References Cited in the file of this patent

UNITED STATES PATENTS

| | | |
|---|---|---|
| 1,337,737 | Van Der Bijl | Apr. 20, 1920 |
| 2,421,747 | Englehardt | June 10, 1947 |
| 2,667,102 | MacDougall | Jan. 26, 1954 |
| 2,849,623 | Drake | Aug. 26, 1958 |

OTHER REFERENCES

"Cathode Ray Tube Displays," Soller et al. M.I.T. Rad. Lab. Series; volume 22, McGraw-Hill Book Co., Inc., N.Y. 1948, pp. 221 and 222.